United States Patent [19]

Tsou et al.

[11] Patent Number: 5,314,760

[45] Date of Patent: * May 24, 1994

[54] ELECTROCHEMICAL CELL ELECTRODE

[75] Inventors: Yu-Min Tsou, Taiwan, China; Robert D. Door, Clute, Tex.; Glenn A. Eisman, Midland, Mich.

[73] Assignee: The Dow Chemical Company, Midland, Mich.

[*] Notice: The portion of the term of this patent subsequent to Dec. 15, 2009 has been disclaimed.

[21] Appl. No.: 937,915

[22] Filed: Aug. 28, 1992

Related U.S. Application Data

[63] Continuation-in-part of Ser. No. 638,940, Jan. 9, 1991, Pat. No. 5,171,644.

[51] Int. Cl.$^5$ .............................................. H01M 4/86
[52] U.S. Cl. ...................................... 429/12; 429/43; 429/44; 429/42; 204/252; 204/280; 204/290 R; 427/77; 427/115; 427/126.1; 427/126.5; 427/126.6; 427/380; 427/384; 427/388.1; 156/309.3; 502/101; 502/155
[58] Field of Search ................... 204/252, 290 R, 291, 204/294, 292, 280, 284; 427/77, 115, 126.1, 126.5, 126.6, 372.2, 380, 384, 388.1; 502/61, 155; 156/309.3, 306.3, 508.2; 429/42, 43, 44, 12

[56] References Cited

U.S. PATENT DOCUMENTS

| | | | |
|---|---|---|---|
| 3,585,079 | 6/1971 | Richter et al. | 136/86 A |
| 4,210,501 | 7/1980 | Dempsey et al. | 204/129 |
| 4,255,498 | 3/1981 | Yoshida | 429/27 |
| 4,272,353 | 6/1981 | Lawrance et al. | 204/283 |
| 4,738,741 | 4/1988 | McMichael | 156/235 |
| 4,824,508 | 4/1989 | McIntyre | 156/276 |
| 4,981,561 | 1/1991 | Babinec et al. | 204/81 |
| 5,151,515 | 9/1992 | Cisar | 429/42 |

OTHER PUBLICATIONS

Journal Chemical Society; Faraday Trans. 1, 1981, 77 pp. 2827–2843.
Journal Electrochemical Society; vol. 136, No. 7 Jul. 1989.

*Primary Examiner*—Kathryn Gorgos

[57] ABSTRACT

A supported catalyst useful in the preparation of an electrode for an electrochemical cell which comprises the residue remaining after heating at about 500° to about 800° C. a transition metal and a polymer such as polyvinylpyridine all adsorbed on a support material. Useful electrodes are prepared by combining the supported catalyst with a current collector.

15 Claims, 1 Drawing Sheet

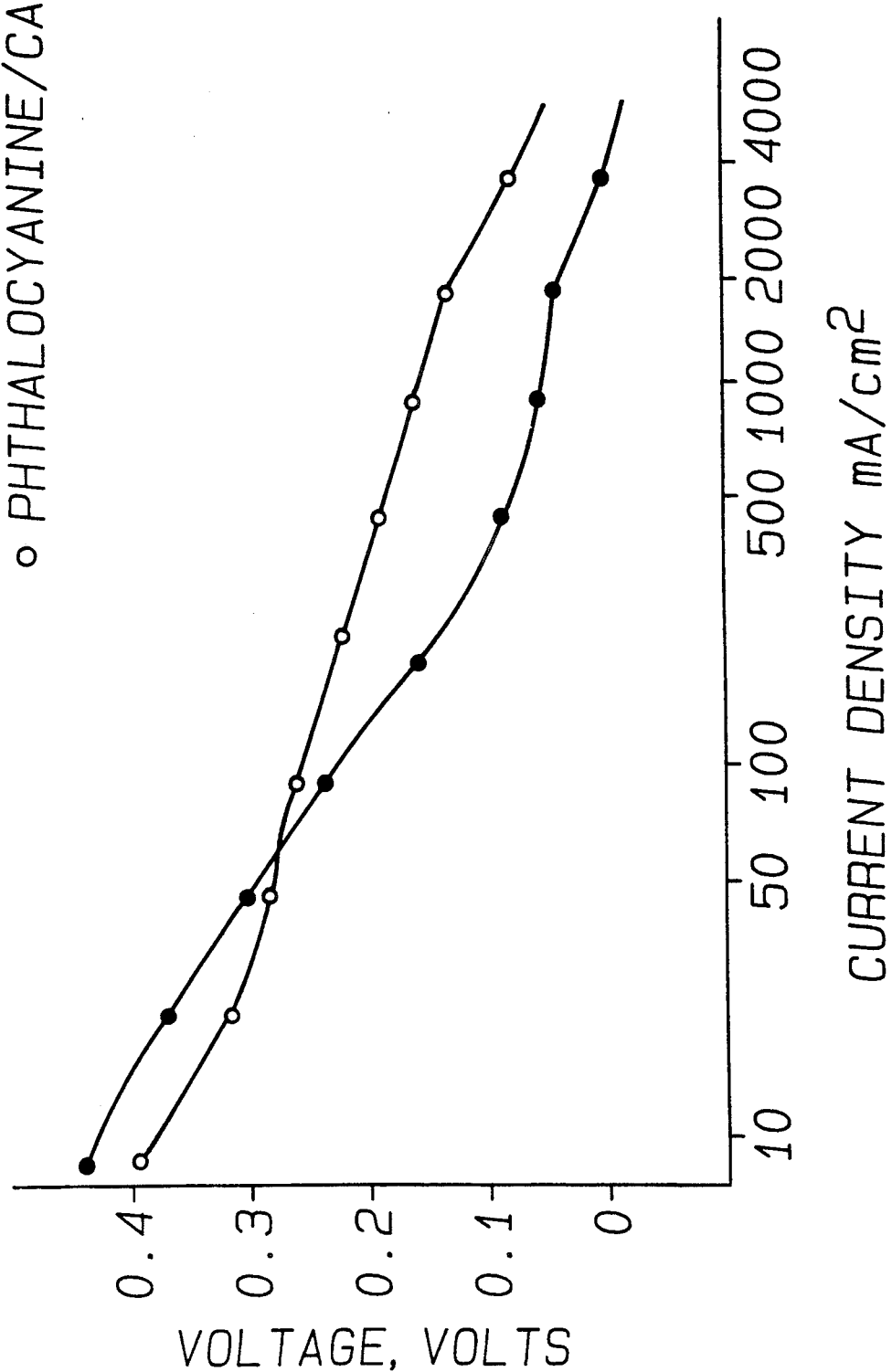

ELECTROCHEMICAL CELL ELECTRODE

This application is a continuation-in-part of copending application Ser. No. 07/638,940, filed Jan. 9, 1991 now U.S. Pat. No. 5,171,644.

BACKGROUND OF THE INVENTION

1. Field of the Invention

This invention relates to catalytic electrodes for electrochemical cells.

2. Description of the Prior Art

The term "fuel cell" is used herein and in the art to denote a device, system, or apparatus in which the chemical energy of a fluid combustible fuel such as hydrogen, carbon monoxide, or an organic compound containing hydrogen in its molecular structure is electrochemically converted to electrical energy at a nonsacrificial or inert electrode. A complete fuel cell is adapted for continuous operation and is supplied with both fuel and oxygen from sources outside the cell proper. Such cells include at least two nonsacrificial or inert electrodes, functioning as an anode and a cathode, respectively, which are separated by an electrolyte which also provides ionic conductance therebetween. There is also provided conduction means for electrical connection between anode and cathode external to the electrolyte, means for admitting a liquid or gaseous fuel into dual contact with the anode and electrolyte, and means for admitting oxygen in dual contact with the cathode and electrolyte. The electrolyte compartments in conventional fuel cells are divided into an anolyte and a catholyte compartment by an ion permeable partition or ion exchange membrane, such as in the solid polymer electrolyte, also known as a porton exchange membrane (PEM) type fuel cell. In this PEM type cell, the membrane, which is a solid polyelectrolyte, acts both as the electrolyte and the cell separator, thus requiring no additional electrolyte. This cell is also termed an ion exchange membrane type fuel cell. In each such cell, a fuel is oxidized at the anode and an oxidant is reduced at the cathode upon receiving electrons from the anode.

Electrodes of the type hereinbefore and hereinafter described are also employed in electrolytic cells which unlike the aforementioned fuel cells do not provide a net production of electrical energy, but in which an organic fuel is oxidized electrochemically at the anode thereof. In such cells, a direct current of electrical energy from an external source, namely a fuel cell, a storage battery or an alternating current rectifier, is admitted to the electrical circuit of the cell to provide the necessary electrical current to operate the cell. Such cells can be used for the electrochemical production of various organic chemicals, such as the conversion of alcohols or hydrocarbons to ketones.

Electrodes for use in these cells vary considerably in both design and composition. Although a single metal structure, such as a platinum sheet or screen, or a structure of porous carbon, such as a flat sheet or a porous carbon cylinder, can be used alone, electrodes commonly comprise a conductive base or current collector with a metal catalyst chemically and/or physically bound to the surface of the base. Such electrodes also include those upon which the catalyst is laid down by electro-deposition, and those which are impregnated with catalyst by soaking the base in a solution comprising a suitable catalyst yielding material, decomposing the adsorbed material and/or reducing the resulting metal-containing material to elemental metal or metal oxide. The latter technique is conventional in the preparation of porous carbon electrodes bearing a metal catalyst. Noble metals, particularly platinum, are effective catalysts in both oxidation-reduction reactions wherein either a basic or acid electrolyte is employed in the cell.

The use of monomeric, as well as, polymeric metal phthalocyanine compounds as oxidation catalysts for chemical reactions are known. For example, nickel phthalocyanine has been employed in the oxidation of long-chain fatty acids, esters, saturated ketones, benzene hydrocarbons, etc. such catalysts, particularly cobalt phthalocyanine, when used as an active component in the cathode of a fuel cell are advantageous over known electrode catalysts comprised of noble metals, primarily in that the cobalt phthalocyanine catalyst is relatively inexpensive and can be produced in any desired amount. One disadvantage of electrodes comprising cobalt phthalocyanine is that this compound has an extremely low conductivity in comparison with noble metal catalyst compositions and, therefore, such metal phthalocyanine catalyst must be applied in very thin layers upon the surfaces of conducting carrier material in the preparation of electrodes. Electrochemical cells having electrodes comprising cobalt phthalocyanine, are disclosed in U.S. Pat. No. 3,585,079 and U.S. Pat. No. 4,255,498. Heat treated, carbon supported metalloporphyrins and metallophthalocyanines as oxygen reduction catalysts are disclosed in *J. Chem. Society; Faraday trans.* 1, 77, 2827–2843 (1981).

It is conventional to prepare electrodes for electrolytic cells by mixing powdered or granular active carbon particles which act as a carrier or support material for the adsorbed catalyst layer. Such electrodes are prepared by mixing the catalyzed carbon particles with a water-repellent binder such as polytetrafluoroethylene and compressing the mixture into a thin sheet.

SUMMARY OF THE INVENTION

There are disclosed novel metal catalysts for use in the preparation of electrodes for electrochemical cells, preferably, fuel cells for converting hydrogen and oxygen to electrical energy. The novel catalysts comprise the residue remaining after heating under an inert atmosphere at a temperature of about 500° C. to about 800° C. a mixture of a transition or noble metal salt and a polymer or copolymer containing a nitrogen-containing functional group in which the nitrogen has a lone pair of electrons which permit the nitrogen to form a coordination complex with a metal. The novel catalyst can be adsorbed on an electrically conductive support or contact material, such as a metal, graphite, or carbon powders heated at about 500° C. to about 800° C., and mixed with a water-repellent binder, such as a fluorinated hydrocarbon polymer, for instance, polytetrafluoroethylene, and, thereafter, coated directly or indirectly onto a current collector such as a carbon fiber paper as steps in the process of making an assembly suitable for use as an electrode. The novel catalyst, support or contact material, and binder can also be coated onto a nonporous substrate and the coating transferred to an electrically conductive material serving as a current collector, such as, carbon fiber paper or a nickel screen or transferred to a solid polymer electrolyte membrane.

When the metal or carbon support material and catalyst are mixed with a water-repellent binder, such as polytetrafluoroethylene, and the mixture coated onto a current collector, such as carbon fiber paper, the assembly can be bonded on the catalyst coated side of the carbon fiber paper to an ion exchange membrane using heat and pressure so as to form one embodiment of an electrode of the invention useful in a solid polymer electrolyte electrolytic cell.

A BRIEF DESCRIPTION OF THE DRAWING

The figure shows supported catalysts of the invention and provide results comparable to that of the cobalt phthalocyanine catalyst of the prior art. The catalysts of the invention are, in addition, significantly less expensive than this prior art catalyst and substantially less expensive than the known supported catalysts comprised of noble metals, such as, platinum black. Instead of cobalt, iron, platinum, and ruthenium can be used in other embodiments of the invention.

DETAILED DESCRIPTION OF THE INVENTION

One embodiment of the catalyst of the invention is prepared by adsorbing onto a finely divided metal, carbon, or graphite, preferably, powdered or granulated active carbon, a solution containing a metal salt, such as, at least one or a mixture of metal salts, or metal alloys thereof, selected from the salts of transition metals in admixture with poly(vinylpyridine). Other useful polymers include polymers and copolymers of poly(vinylcarbazole), poly(acrylonitrile), poly(methacrylonitrile), poly(allylamine), poly(4-vinylpyridine), poly(2-vinylpyridine), poly(ethyleneimine), and poly(aminostyrene). Useful transition metal salts include metals such as iron, cobalt, nickel, molybdenum, chromium, manganese, tungsten, titanium, zinc, copper, cadmium, and vanadium. Other useful metals include the noble metals platinum, palladium, osmium, iridium, rhodium, and ruthenium.

The concentration of the metal salt and polymer, for instance, poly(4-vinylpyridine) in solution is controlled so that the coating of the support material takes place from (1) an all organic solvent or (2) a mixed organic solvent and an aqueous solvent solution of the metal salt and poly(4-vinylpyridine), which is not precipitated. Generally, organic solvents such as methanol, ethanol, 1-propanol, and 2-propanol are utilized to dissolve the polyvinylpyridine. Water is used to dissolve the metal salt. The atomic ratio of metal salt to one of the pyridine repeating units of the polyvinylpyridine is, generally, about 0.001 to 1.0, preferably, about 0.01 to 0.5, and, most preferably, about 0.05 to 0.25. The ratio of metal salt to the support material is, generally, about 0.01 to 50 grams, preferably, about 0.1 to 5 grams, and, most preferably, about 0.5 to 2.5 grams per gram of support material.

In the preparation of one embodiment of the supported catalyst of the invention on a carbon support, subsequent to soaking the carbon powder in a solution of metal salt and, for instance, poly(4-vinylpyridine), the coated carbon support material is filtered and the solvent is evaporated. The coated carbon support assembly is then heated to decompose the poly(4-vinylpyridine). Generally, heating is conducted at about 500° to about 800° C., preferably, about 600° to 700° C., and most preferably, at about 650° to 690° C., under a nitrogen atmosphere for about 3–5 hours. Subsequently, the catalyst adsorbed on the carbon support can be applied from a mixture of catalyst and a water-repellent binder, such as, polytetrafluoroethylene to coat a current collector substrate such as a carbon fiber paper on one side. Coating can be accomplished using a metering bar, metering rod, or a coating knife.

As an alternative to direct coating of the catalyst on a current collector substrate, the aqueous dispersion of binder and the supported metal poly(4-vinylpyridine) catalyst complex can be coated onto a smooth, non-porous surface such as niobium foil and, subsequently, transferred to a current collector such as a metal screen or carbon fiber paper, by the use of heat and pressure. Coating can be accomplished using a coagulated or non-coagulated aqueous dispersion comprising a polytetrafluoroethylene binder. The dispersion can be coagulated utilizing at least one of the following methods, i.e., the addition of a water miscible organic solvent or the raising of the temperature of the dispersion slightly above ambient temperature. The coating of the smooth non-porous surface is accomplished utilizing a coating rod, or bar or knife, as is conventional in this art. Successive applications may be required to obtain the desired coating thickness. For use in cells characterized as solid polymer electrolyte electrolytic cells, the coated side of individual catalyst coated carbon fiber paper sheets can be bonded to both sides of an ion exchange membrane.

As a substitute for the preferred poly(4-vinylpyridine), alternative polymers, which can function suitably to take the place of the preferred poly(4-vinylpyridine), can be used. These can be defined as polymeric compounds containing a nitrogen-containing functional group in which the nitrogen has a lone pair of electrons which can form a coordination complex with a metal ion.

When an electrode is prepared utilizing an ion exchange membrane, the membrane can be, preferably, selected from the two broad classes of cation exchange resins; the so-called sulfonic acid cation exchange resins and the carboxylic acid cation exchange resins. In the sulfonic acid membranes, the cation ion exchange groups are hydrated sulfonic acid groups which are attached to the polymer backbone by sulfonation. In the carboxylic acid resins, the ion exchanging group is $COO^-$.

The preferred ion exchange membranes are disclosed in U.S. Pat. No. 4,478,695 and U.S. Pat. No. 4,470,889, incorporated herein by reference. These materials, on an equivalent weight basis, generally hydrate less when immersed in water at the boil, in accordance with prior art hydration procedures, than the sulfonated perfluorocarbon membranes sold under the trade designation NAFION. At equivalent weights which are better for ion transport, i.e., lower equivalent weights provide lower electrical resistance in the cell, the membranes described in the '695 and '889 patents can be hydrated to absorb about 40–50% by weight based upon the dry weight of the membrane. These more suitable membranes would have equivalent weights of about 750–1000.

A typical proton exchange membrane (PEM) assembly can be made by first hydrating the ion exchange membrane and subsequently bonding a catalyst layer thereto utilizing heat and pressure. Generally, the hydration of the membrane is accomplished by first converting the membrane from the salt form to the proton form. The salt form (usually the sodium or potassium salt) is thus converted by placing it in a strong acid solution, such as sulfuric acid. Subsequently, the membrane is washed and boiled. Water of hydration is incorporated into the membrane by heating it at a temperature of about 160°-210° C., preferably, by pressing the membrane. Subsequently, the membrane is exposed to water at room temperature up to the boiling point. The membrane/electrode assemblies are subsequently prepared by combining the hydrated proton form of the membrane with an electrode layer. The electrode layer is prepared in accordance with one embodiment of this invention by bonding to carbon fiber paper a previously heat treated metal polyvinylpyridine catalyst on a supporting carbon particle using a water-repellent fluorinated hydrocarbon binder, such as, polytetrafluoroethylene. As the last step in the preparation of the membrane/electrode assembly, a hydrated ion exchange membrane is bonded by pressing at elevated temperature to a catalyst-coated current collector. Bonding is, generally, accomplished at a temperature of about 160°-210° centrigrade. Alternatively, the previously heat treated metal polyvinylpyridine catalyst materials of one embodiment of the invention can be deposited directly upon the surface of an ion exchange membrane in the form of finely-divided particles or powders, such as support material metal powders or finely-divided granular or powdered carbon. Although the particle size of the supported catalytic material is not critical, a preferred range of particle size is from about 25-1000 angstrom units.

Since the catalytic particles upon the surface of the solid polymer electrolyte membrane must be energized for the passage of current for the electro-oxidation or electro-reduction of chemicals and elements, for the passage of current through the solid polymer electrolyte membrane, and the like, the catalyst particles or powder must be of the type generally classified as conductive, that is, such catalyst particles or powder must be electrically conductive.

As used herein, finely-divided means any powder form, particulate, form, granular form, bead form, or any other form of catalyst or support material which may be deposited upon a carbon fiber paper, a non-porous support, or a solid polymer electrolyte membrane. The amount of catalyst material which is deposited directly or indirectly upon the surface of the carbon fiber paper or on the solid polymer electrolyte membranes in accordance with the process of the present invention, is not critical. The catalytic particles must be fixed upon the surface of the carbon fiber paper or alternative current collector or solid polymer electrolyte membrane. Any well known fixing technique of adhering, bonding or otherwise uniting a particulate or powdered material to a surface may be used. In the prior art, bonding of electrode layers is disclosed at temperatures up to 177 degrees centigrade. Catalytic particles or powder may be fixed upon the surfaces of the carbon fiber paper or solid polymer electrolyte membrane by any one or a combination of pressure, heat, adhesive, binder, solvent, electrostatic means, and the like. The preferred embodiment for fixing the particles of catalyst upon said surfaces is by a combination of pressure and heat.

The following Examples illustrate the various aspects of the invention but are not intended to limit its scope. Where not otherwise specified throughout this specification and claims, temperatures are given in degrees centigrade and parts, percentages, and proportions are by weight.

EXAMPLE 1

The catalyst of the invention was deposited on a carbon powder in accordance with the following procedure. To a rapidly stirred 25 milliliter methanol solution of 0.8 gram poly(4-vinylpyridine) per 100 milliliters of methanol, said poly(4-vinylpyridine) having a molecular weight of $4.9 \times 10^5$, there are added 25 milliliters of a 10 millimolar, aqueous solution of cobalt chloride containing 0.1 molar sodium acetate as a buffer to maintain the pH at about 5.5. To this solution, there are added 2 grams of carbon powder sold under the trade designation XC-72 by the Cabot Corporation. Stirring of the solution is continued until uniform and then the solution is filtered and the solvent evaporated. Thereafter, the carbon powder having the cobalt chloride and poly(4-vinylpyridine) deposited thereon is heated to 650°-690° C. under a nitrogen atmosphere. The carbon is, thereafter, slowly cooled under a nitrogen atmosphere.

EXAMPLE 2

Using the carbon supported catalyst of Example 1, an aqueous coating dispersion containing polytetrafluoroethylene as a binder was prepared and, thereafter, a coating was applied to a carbon fiber paper to produce an electrode in accordance with the following procedure.

The electrode fabrication consists of two steps, first, the carbon fiber paper is wet proofed by coating with an aqueous dispersion of polytetrafluoroethylene and, thereafter, a coating of the carbon powder and cobalt polyvinylpyridine is formed on the surface of a niobium foil by the application of a mixture of 70 percent be weight of the carbon supported catalyst prepared in Example 1 with 30 percent by weight of polytetrafluoroethylene latex sold under the trade name Teflon T-30 by DuPont. After drying, the coating was transferred to the wet proofed carbon fiber paper by pressing the wet proofed carbon fiber paper against the coated surface of the niobium plate at a pressure of about 1000 psi and a temperature of about 40° C. for 2-7 minutes. Thereafter, the assembly was heated in an oven at 350° C. for 5 minutes. After cooling at ambient temperature, the assembly was placed in water and the niobium foil was slowly peeled away to leave a catalyst coating on the wet proofed carbon fiber paper. The final electrode assembly was prepared by bonding a perfluorosulfonic acid membrane of 837 equivalent weight to the coated side of the wet proofed carbon fiber paper by pressing at 500 psi and 177° C. for 5 minutes.

In wet proofing the carbon fiber paper, a polytetrafluoroethylene loading of approximately 10-15 mg per square centimeter was used. As is apparent, the polytetrafluoroethylene in the electrode catalyst layer serves the purpose of preventing the catalyst particles from being wet by water when the electrode is used in an electrochemical cell. Such wetting would degrade the performance of the electrode by preventing the oxygen gas from reacting readily with the catalyst. If the catalyst particles are wet by water, the oxygen gas would be required to diffuse through this water layer, thus, slowing the reaction considerably.

The carbon fiber paper used in the preparation of the electrode is sold under the trade name PC-206 by The Stackpole Fibers Company. This is a high porosity carbon fiber paper having a porosity rating of approximately 80%. The paper used is typically 14 mils in thickness.

EXAMPLE 3

The solid polymer electrolyte electrode of Example 2 was placed in a test fuel cell as described in the Experimental section of an article entitled "Oxygen Reduction in a Proton Exchange Membrane Test Cell", the authors of which include two of the joint inventors of this application, said article appearing in the *J. Electrochemical Soc.* Vol. 135, No. 7, Jul. 1989, incorporated herein by reference. Determinations of voltage for various current densities were obtained utilizing the electrode as the cathode in said test fuel cell. The initial operating conditions for the cell were as follows: 10 pounds per square inch oxygen pressure, 85% relative humidity, oxygen flow rate of 27 cubic centimeters per minute. The test results are shown in Table I and in FIG. 1 in comparison with an electrode similarly prepared (as indicated in Examples 4–6) and utilized in a fuel cell in which cobalt phthalocyanine was used as a catalyst on a carbon support.

Generally, the electrochemical test cell apparatus consists of a potentiostat/galvanostat which is used to supply current between the catalytic electrode of a membrane/electrode assembly and a platinum wire which is used as the counter-electrode. The potential between the catalytic electrode and the calomel reference electrode at the applied current was determined using the potentiostat/galvanostat. The membrane/electrode assembly was placed between two portions of the test cell which were then clamped together. The top portion of the test cell is used as a sulfuric acid reservoir to provide a source of protons to be transported through the membrane and consumed in the porous electrode. The bottom portion of the test cell is used to supply oxygen to the porous electrode. Oxygen gas is flowed into the bottom portion of the test cell. The membrane/electrode assembly consists of a membrane, a porous backing layer made of teflon-impregnated carbon fiber paper and a catalytic layer made of a mixture of carbon-supported catalyst and a polytetrafluoroethylene binder. Platinum gauze was placed beneath the carbon fiber paper of the membrane/electrode assembly to serve as the current collector. Purified oxygen is fed to the test cell by way of a humidifier in which the oxygen gas is bubbled through a container partially filled with water. The gas pressure in the test cell is regulated and monitored utilizing a pressure gauze. A rotameter is used to measure the gas flow rate.

EXAMPLE 4–6

Controls, forming no part of this invention

Utilizing cobalt phthalocyanine as a catalyst, the procedure of Examples 1–3 was followed (except that no heat treatment was used) in order to prepare and test an electrode in order to determine performance characteristics in a fuel cell of a prior art catalytic electrode in comparison with the inventive electrode of Example 2. Results of Example 6 are shown in the Figure.

EXAMPLE 7

Example 2 is repeated using the supported catalyst of Example 1 except that the supported catalyst mixture of Example 1 and polytetrafluoroethylene latex is coagulated prior to coating the mixture onto niobium foil. The coagulated mixture was prepared by diluting the Teflon T-30 latex with 50 milliliters of water and subsequently adding the cobalt polyvinylpyridine/carbon supported catalyst with continuous stirring. The coagulum was formed by adding 2 to 3 drops of 2-propanol while stirring until a coagulum was formed. The coagulum can also be induced more quickly by warming the solution to about 60° C. Subsequent to decanting the solvent, the coagulum obtained is rinsed with water several times and, thereafter, the coagulum is coated onto a niobium foil and allowed to dry. The electrode is then prepared in accordance with the remaining procedure of Example 2. Test results are shown in the Table.

EXAMPLE 8

This example describes the preparation of an iron poly(4-vinylpyridine) catalyst supported on carbon powder.

An aqueous solution of 20 millimolar iron (III) chloride containing 0.4 molar sodium acetate as a buffer (pH 5.5) in the amount of 12.5 milliliters was combined with 12.5 milliliters of an aqueous solution of 100 millimolar $NH_2OH$ HCl (hydroxyammonium chloride) to reduce iron (III) to iron (II). After the solution becomes clear, stirring was continued for 20 minutes and then the mixture was filtered. The clear filtrate was mixed with an equal volume of 0.8 grams per 100 milliliters of poly(4-vinylpyridine) dissolved in methanol while stirring rapidly to effect the solution of the iron polyvinylpyridine complex.

A supported catalyst utilizing carbon as a support was prepared in accordance with the procedure of Example 7 except that the iron poly(4-vinylpyridine)/polytetrafluoroethylene binder weight ratio was 50/50 on a percent by weight basis. The performance of this catalyst, when utilized in the test cell described in Example 3, is detailed in the Table below.

EXAMPLE 9

This example described the preparation of a platinum poly(4-vinylpyridine) catalyst supported on carbon powder.

A platinum salt, $(NH_4)_2PtCl_4$ in the amount of 24 milligrams was added to 12.5 milliliters of a solution of poly(4-vinylpyridine) in methanol containing 0.8 grams of polymer per 100 milliliters of methanol. The mixture was filtered and methanol was added to bring the total volume to 25 milliliters. Carbon powder sold under the trade name XC-72 by Cabot Corporation was added to this mixture and the mixture stirred for 4 hours. Thereafter, the solution was filtered and the platinum/polyvinylpyridine supported on the carbon powder was heat treated at a temperature of 650°–690° C. under an inert atmosphere. An electrode assembly was prepared in accordance with the procedure of Example 2 utilizing 70% by weight of the supported catalyst with 30% by weight of the polytetrafluoroethylene dispersion. Test results are shown in the Table.

EXAMPLE 10

This example described the preparation of a ruthenium (bipyridine)$_2$chloridepoly(4-vinylpyridine) catalyst supported on a carbon powder.

Ruthenium (bipyridine)$_2$Cl$_2$ in the amount of 33 milligrams, containing 2 molecules of water of hydration, was slowly dissolved in hot methanol under a nitrogen atmosphere. After degassing the mixture, 12.5 milliliters of a solution of poly(4-vinylpyridine) in methanol containing 0.8 grams of polymer per 100 milliliters of methanol was added to the solution of the ruthenium salt with stirring. The solution was heated at reflux for 1/2 an hour and then 1 gram of a carbon powder sold under the trade name XC-72 was added with stirring. After continuing stirring for 30 minutes, the methanol was slowly evaporated to deposit the ruthenium polyvinylpyridine complex on the carbon powder.

An electrode assembly was prepared in accordance with the procedure of Example 2 except that the solvent utilized to prepare the catalyst coating mixture was NaBr:H$_2$O:acetone 30:55:15 on a volume basis. The catalyst coating mixture contained 70% by weight of the supported catalyst and 30% by weight of polytetrafluoroethylene dispersion.

The test results of this electrode in the test cell described in Example 3 are reported in the Table.

TABLE

Performance of Electrodes of the Invention in a Test Cell

| Example (Metal) | Current (mA/cm$^2$) | Volts (vs. standard Hydrogen Electrode) |
|---|---|---|
| 2 (Cobalt) | 10 | 0.441 |
|  | 100 | 0.242 |
|  | 500 | 0.085 |
|  | 1000 | 0.056 |
| 7 (Cobalt) | 10 | 0.498 |
|  | 100 | 0.300 |
|  | 500 | 0.088 |
|  | 1000 | 0.032 |
| 8 (Iron) | 10 | 0.474 |
|  | 100 | 0.272 |
|  | 500 | 0.203 |
|  | 1000 | 0.170 |
| 9 (Platinum) | 10 | 0.747 |
|  | 100 | 0.612 |
|  | 500 | 0.422 |
|  | 1000 | 0.317 |
| 10 (Ruthenium) | 10 | 0.326 |
|  | 100 | 0.175 |
|  | 500 | 0.073 |
|  | 1000 | 0.038 |

EXAMPLES 11–13

The procedure of Examples 1, 2, and 7 is repeated utilizing poly(2-vinylpyridine) substituted for the poly(4-vinylpyridine) utilized in Examples 1, 2, and 7. Upon evaluation of the electrodes prepared in this manner, these electrodes show substantial electroactivity for oxygen reduction.

EXAMPLES 14–16

Examples 1, 2, and 7 are repeated utilizing poly(ethyleneimine) substituted for the poly(4-vinylpyridine) utilized in Examples 1, 2, and 7. Upon evaluation of the electrodes prepared in these examples, these electrodes show substantial electroactivity for oxygen reduction.

EXAMPLES 17–19

Examples 1, 2, and 7 are repeated utilizing poly(4-aminostyrene) substituted for the poly(4-vinylpyridine) utilized in Examples 1, 2, and 7. Upon evaluation of the electrodes prepared in these examples, these electrodes show substantial electroactivity for oxygen reduction.

EXAMPLES 20–22

Examples 8, 9, and 10 are repeated substituting poly(2-vinylpyridine) for the poly(4-vinylpyridine) of Examples 9 through 10. Upon evaluation of the electrodes prepared in these examples, these electrodes shown substantial electroactivity for oxygen reduction.

EXAMPLES 23–25

Examples 8, 9, and 10 are repeated substituting poly(ethyleneimine) for the poly(4-vinylpyridine) utilized in Examples 8 through 10. Upon evaluation of the electrodes prepared in these examples, these electrodes show substantial electroactivity for oxygen reduction.

EXAMPLES 26–28

Examples 8, 9, and 10 are repeated substituting poly(4-aminostyrene) for the poly(4-vinylpyridine) utilized in Examples 9 and 10. Upon evaluation of the electrodes prepared in these examples, these electrodes show substantial electroactivity for oxygen reduction.

EXAMPLES 29–40

Examples 1, 2, and 7 are repeated using successively poly(vinylcarbazole), poly(acrylonitrile), poly(methacrylonitrile), and poly(allylamine). Upon evaluation of the electrodes prepared in this manner, it is found that these electrodes show substantial electroactivity for oxygen reduction.

While this invention has been described with reference to certain specific embodiments, it will be recognized by those skilled in the art that many variations are possible without departing from the scope and spirit of the invention. It will be understood that it is intended to cover all changes and modifications of the invention disclosed herein for the purposes of illustration, which do not constitute departures from the spirit and scope of the invention.

The embodiments of the invention in which an exclusive property or privilege is claimed are defined as follows:

1. An electrode for an electrochemical cell comprising a current collector, a mixture of a water-repellent binder and a support material having adsorbed thereon a transition metal or noble metal catalyst comprising a residue remaining after heating of a transition or noble metal salt and a polymer selected from the group consisting of polymers and copolymers of poly(4-vinylpyridine), poly(2-vinylpyridine), poly(ethyleneimine), poly(aminostyrene), poly(vinylcarbazole), poly(acrylonitrile), poly(methacrylonitrile), and poly(allylamine) wherein said electrode is prepared by the process comprising treating said support material with a solvent solution of a mixture of a transition metal or noble metal salt and said polymer, removing said solvent, and heating said mixture under an inert atmosphere at a temperature of about 500 to about 800 degrees centigrade.

2. The electrode of claim 1, wherein said heating is under an inert atmosphere, said transition metal is selected from the group consisting of iron, cobalt, nickel, molybdenum, chromium, manganese, tungsten, titanium, zinc, copper, cadmium, and vanadium, said noble metal is selected from the group consisting of platinum, palladium, ruthenium, osmium, rhodium, and iridium, said support material is a metal, carbon, or graphite, said current collector is carbon fiber paper, and said binder is a fluorinated hydrocarbon.

3. The electrode of claim 2, wherein said transition metal is cobalt or iron, said noble metal is platinum or ruthenium, and said binder is polytetrafluoroethylene.

4. An electrochemical cell comprising electrodes consisting of an anodic electrode, a cathodic electrode, and an electrolyte and at least one of said electrodes comprising a current collector combined with a layer of a mixture of a binder and a transition metal or noble metal catalyst on a support material, said catalyst comprising a residue remaining after heating at about 500 to about 800 degrees centigrade a mixture of a transition or noble metal salt and a polymer selected from the group consisting of polymers and copolymers of poly(4-vinylpyridine), poly(2-vinylpyridine), poly(ethyleneimine), poly(aminostyrene), poly(vinylcarbazole), poly(acrylonitrile), poly(methacrylonitrile), and (poly(allylamine).

5. The electrochemical cell of claim 4, wherein said support material is a metal, carbon, or graphite and said binder is a fluorinated hydrocarbon polymer.

6. The electrochemical cell of claim 5, wherein said binder is polytetrafluoroethylene and said cell is a fuel cell for the conversion of hydrogen and oxygen.

7. The fuel cell of claim 6, wherein said transition metal is selected from the group consisting of iron, cobalt, nickel, molybdenum, chromium, manganese, tungsten, titanium, zinc, copper, cadmium, and vanadium, and said noble metal is selected from the group consisting of platinum, palladium, ruthenium, osmium, rhodium and iridium.

8. The fuel cell of claim 7, wherein said transition metal is cobalt or iron, said noble metal is platinum or ruthenium, and said support material is powdered or granular active carbon.

9. A process for preparing a supported transition metal or supported noble metal catalyst comprising:

A. adsorbing onto a support material a mixture comprising a solvent solution of a transition or a noble metal salt and a polymer selected from the group consisting of polymers and copolymers of poly(4-vinylpyridine), poly(2-vinylpyridine), poly(ethyleneimine), poly(aminostyrene), poly(vinylcarbazole), poly(acrylonitrile), poly(methacrylonitrile), and poly(allylamine), B. removing said solvent, and C. heating said mixture at a temperature of about 500 to about 800 degrees centigrade.

10. The process of claim 9 wherein said transition metal is selected from iron, cobalt, nickel, molybdenum, chromium, manganese, tungsten, titanium, zinc, copper, cadmium, and vanadium and said noble metal is selected from the group consisting of platinum, palladium, osmium, ruthenium, rhodium, and iridium.

11. The process of claim 10 wherein said mixture is heated under an inert atmosphere and wherein said transition metal is selected from the group consisting of cobalt and iron and said support material is a metal, carbon, or graphite.

12. An improved supported transition metal or supported noble metal catalyst comprising a residue remaining after heating a support material and a mixture of a binder, a transition or noble metal salt, and a polymer or copolymer selected from the group consisting of polymers and copolymers of poly(4-vinylpyridine), poly(2-vinylpyridine), poly(ethyleneimine), poly(aminostyrene), poly(vinylcarbazole), poly(acrylonitrile), poly(methacrylonitrile), and poly(allylamine).

13. The catalyst of claim 12 wherein said transition metal is selected from iron, cobalt, nickel, molybdenum, chromium, manganese, tungsten, titanium, zinc, copper, cadmium, and vanadium, said noble metal is selected from the group consisting of platinum, palladium, osmium, ruthenium, rhodium, and iridium.

14. The supported catalyst of claim 13 wherein said support material and said mixture are heat treated at a temperature of 500 to about 800 degrees centigrade, said transition metal is selected from the group consisting of cobalt and iron, and said support material is a metal, carbon, or graphite.

15. The supported catalyst of claim 14 wherein said heat treatment is carried out under an inert atmosphere.

* * * * *